No. 777,316. PATENTED DEC. 13, 1904.
C. TITTEL.
PAPER STOCK FILTER.
APPLICATION FILED JUNE 20, 1904.
NO MODEL.
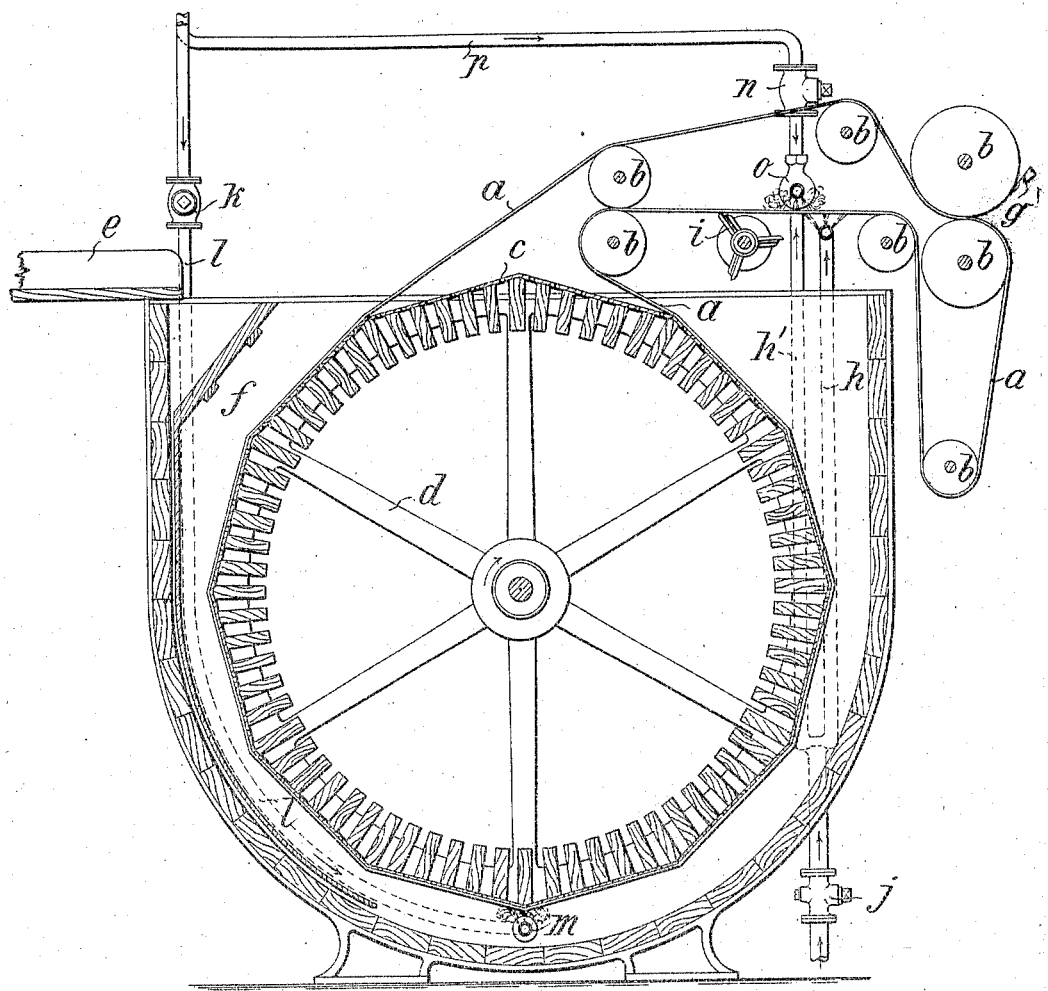
Witnesses.
James L. Norris, Jr.
C. D. Hesler.
Inventor
Clemens Tittel
By James L. Norris.
Attys.

No. 777,316.

Patented December 13, 1904.

UNITED STATES PATENT OFFICE.

CLEMENS TITTEL, OF JOSEFSTHAL, NEAR LAIBACH, AUSTRIA-HUNGARY.

PAPER-STOCK FILTER.

SPECIFICATION forming part of Letters Patent No. 777,316, dated December 13, 1904.

Application filed June 20, 1904. Serial No. 213,395. (No model.)

*To all whom it may concern:*

Be it known that I, CLEMENS TITTEL, a subject of the Emperor of Austria-Hungary, residing at Josefsthal, near Laibach, Province of Carniola, Austria-Hungary, have invented certain new and useful Improvements in Paper-Stock Filters, of which the following is a specification.

This invention relates to paper-stock filters for recovering paper-stock contained in the waste waters from paper-making machinery, and the object thereof is to construct a filter of such class with means hereinafter referred to for cleaning the wet felt of the filter when necessary without dismantling the filter, which is generally now the case.

For regaining the paper stuff contained in the waste water from paper-making machines generally the filters which are employed comprise in their construction an endless wet felt which is led over guide-rollers and is stretched over a metal sieve carried by the wheel, the rotary motion of the latter being continuously imparted to the felt. The paper stuff of the waste waters that is supplied to the filter during the operation of the filtering adheres to the felt, while the filtered water passes away through the wheel, the paper stuff contained in the water adhering to the felt during the filtering operation and during the travel of the felt is compressed against a roller and is removed from the felt through the medium of a scraper. This method is open to the disadvantage that the felt, notwithstanding the employment of a washing device for the filter, becomes after a comparatively short time clogged with the paper stuff, so that although the felt may still take up a certain amount of the paper stuff it will not take up the more valuable fibers of the paper stuff, as said fibers pass away with the waste water. Consequently the daily yield of the filter is reduced by about eighty per cent. and the material obtained is of lower value, as it consists mostly of a filling material. In order to prevent this disadvantage, the felt has to be frequently changed—that is to say, the filter has to be dismantled, the wheel lifted out, and the felt removed and replaced by fresh felt, whereupon the filter is again mounted and operated. This manner of operating the filters necessitates a considerable expenditure of time and is also open to the objection that waste waters flow away unfiltered, so that the yield of the filter becomes comparatively small.

The present invention aims to overcome the foregoing objections, and for this purpose the filter is provided with means hereinafter referred to more specifically, so that the felt during the travel thereof is treated on its external surface with steam, with water, and is also cleaned on its inner surface by means of water heated by steam.

In describing the invention in detail reference is had to the accompanying drawing, forming a part of this specification, and which illustrates a sectional elevation of a paper-stock filter constructed in accordance with this invention.

Referring to the drawing by reference characters, $a$ denotes the endless wet felt; $b$, the guide-rollers therefor; $c$, the metal sieve carried by the wheel $d$, the rotary motion of the latter being the medium for causing the travel of the felt. The wheel $d$ is mounted within a suitable casing $f$ and the guide-rollers $b$ exterior of the casing $f$. The waste waters are led into the casing from a trough $e$.

The reference character $g$ denotes a scraper for removing the paper stuff from the wet felt $a$, which has been pressed upon the felt through the medium of the guide and presser rollers $b$.

Arranged exterior of the casing $f$ is a pair of water-supply pipes (indicated by the reference characters $h$ and $h'$) which communicate with a feed-pipe closed through the medium of a cut-off $j$.

A beater $i$ of known construction is arranged in operative relation with respect to the endless wet felt $a$.

The foregoing parts are of known construction.

The reference character $l$ denotes a steam-supply pipe which is arranged exterior of the casing $f$ and is provided with a regulating-valve $k$. The pipe $l$ extends to below the lower side of the wheel $d$, and to the lower end of said pipe is attached a perforated steam-spray pipe $m$, closed at its inner end and which is adapted to extend within the casing $f$ and across the felt $a$, as well as being arranged in close proximity to the felt $a$. Leading from the pipe $l$ and provided with a valve $n$ is a steam-pipe $p$, which communicates with a mixing-valve $o$. Said mixing-valve $o$ is arranged above a portion of the felt $a$ and has communicating therewith a perforated discharge-pipe, which extends over the felt $a$. Said mixing-valve $o$ is also in communication with the pipe $h'$. The other pipe, $h$, is arranged below the felt $a$, or, in other words, the felt $a$ is adapted to travel between the mixing-valve $o$ and the mouth of the pipe $h$.

The manner in which the filter operates is as follows: As soon as the wet felt $a$ appears to be more or less clogged the supply of waste water from the trough $e$ is stopped and the water contained in the casing $f$ is run off. The valve $k$ is then opened, so that the steam can issue through the perforations of the pipe $m$, so as to act upon the under side of the felt $m$, along its entire width, thereby heating the water and washing off the filling material adhering to the felt. The valve $m$ of the steam-pipe $p$ is then opened and the steam issues through the mixing-valve $o$, where it mixes with the cold water which flows through the pipe $h'$ into the mixing-valve when the cock $j$ is opened. The water is thus heated in the mixing-valve by the steam and issues with considerable force against the felt, whereby the inner surface of the felt is cleaned without in any way damaging the same. The washing of the wet felt, which takes place during the continued rotation of the filter-wheel, only lasts a very short time and possesses several essential advantages. These consist in that there is a gain of the intercepted paper stuff, as the waste waters are continuously operated on and a uniform rate of production is obtained. Furthermore, the felt remains operative for a longer space of time and until it is entirely worn out in the apparatus, and, lastly, in consequence of the doing away of the frequent dismounting of the apparatus, such as was heretofore necessary, the cost of working is reduced and repairs are more seldom required. These advantages increase the value of the apparatus to a considerable extent, as the working is rendered more profitable by the described improved method.

Having thus fully described my invention, what I claim as new, and desire to secure by Letters Patent, is—

1. In a paper-stock filter, the combination with a casing, a rotatable wheel arranged therein, and an endless band traveling over said wheel, of a perforated steam-spray pipe arranged within the casing and extending transversely of the exterior side of said band, a closable steam-supply pipe communicating with said perforated pipe, a closable branch pipe communicating with said steam-supply pipe, a water-supply pipe, a steam-and-water-mixing device communicating with said branch pipe and said water-supply pipe, and a perforated spray-pipe arranged exterior of the casing and extending transversely of the interior side of said band and communicating with said mixing device.

2. A paper-stock filter involving a traveling band, a steam-spray pipe communicating with a steam-supply and extending transversely of the exterior side of said band, a steam-and-water-mixing device communicating with a steam and a water supply, and a spray-pipe communicating with said mixing device and extending transversely of the interior side of said band.

3. In a paper-stock filter, the combination with a casing, a rotatable wheel arranged therein and an endless felt band traveling over said wheel, of a perforated steam-spray pipe arranged within the casing and extending transversely over the whole width of the exterior side of said band, a closable branch pipe communicating with the steam-supply and with said perforated pipe, a second closable branch pipe communicating with the steam-supply, a closable feed-pipe for supplying water under pressure, a steam-and-air-mixing device communicating with said second closable branch pipe and said water-feed pipe, a perforated pipe extending transversely of the interior surface of said band and communicating with said mixing device, and a water-pipe for ejecting water against the exterior side of said band, said water-ejecting pipe having the discharge end thereof arranged in suitable relation with respect to the perforated pipe communicating with the mixing device.

In testimony whereof I have hereunto set my hand in presence of two subscribing witnesses.

CLEMENS TITTEL.

Witnesses:
JOSEF RUBASCH,
ALVESTO S. HOGUE.